Figure 1:
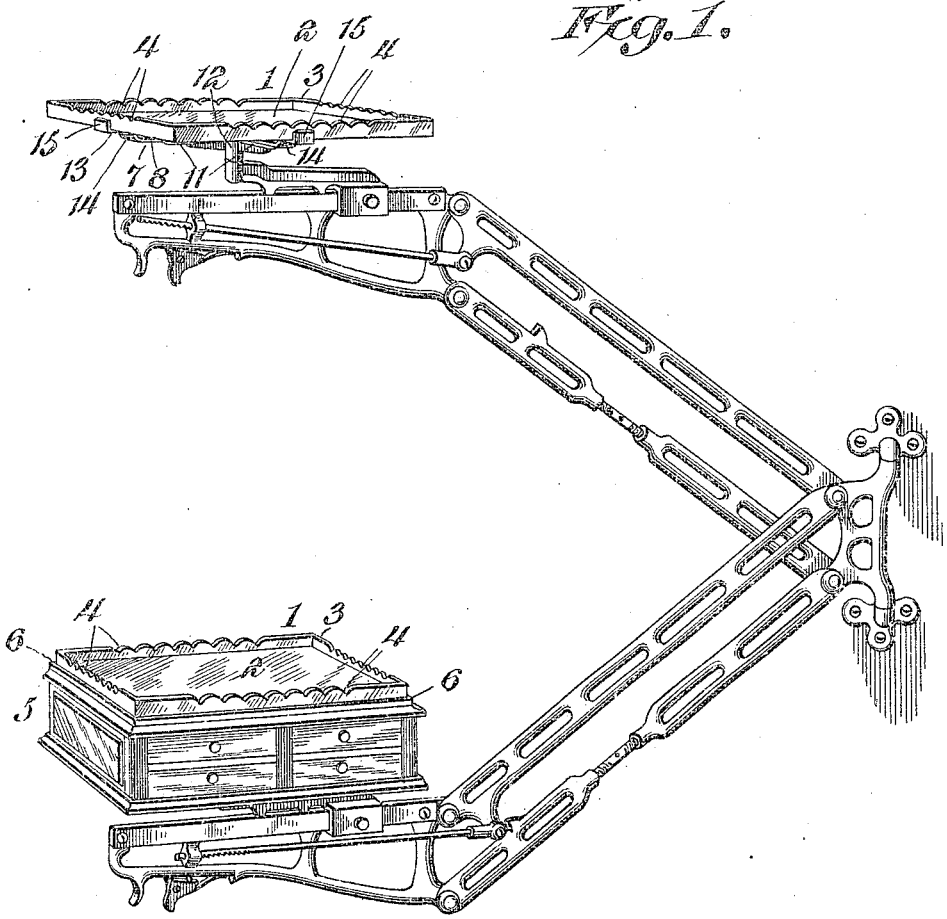

G. HOLTZ.
SANITARY DENTAL BRACKET TRAY.
APPLICATION FILED MAR. 26, 1909.

959,534.

Patented May 31, 1910.

2 SHEETS—SHEET 1.

Gustav Holtz, Inventor,

G. HOLTZ.
SANITARY DENTAL BRACKET TRAY.
APPLICATION FILED MAR. 26, 1909.
959,534.
Patented May 31, 1910.
2 SHEETS—SHEET 2.
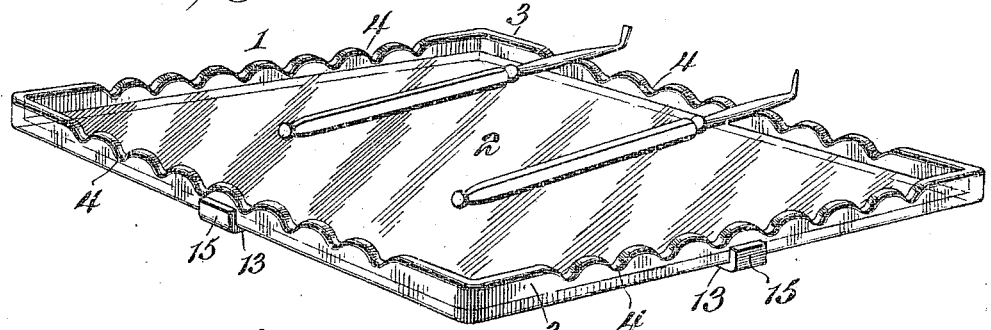
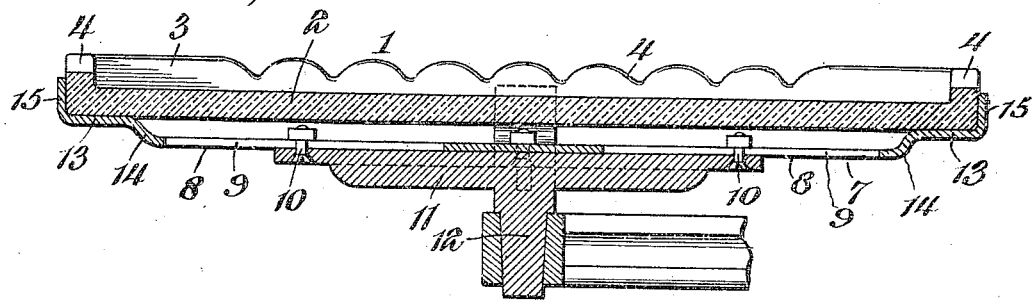
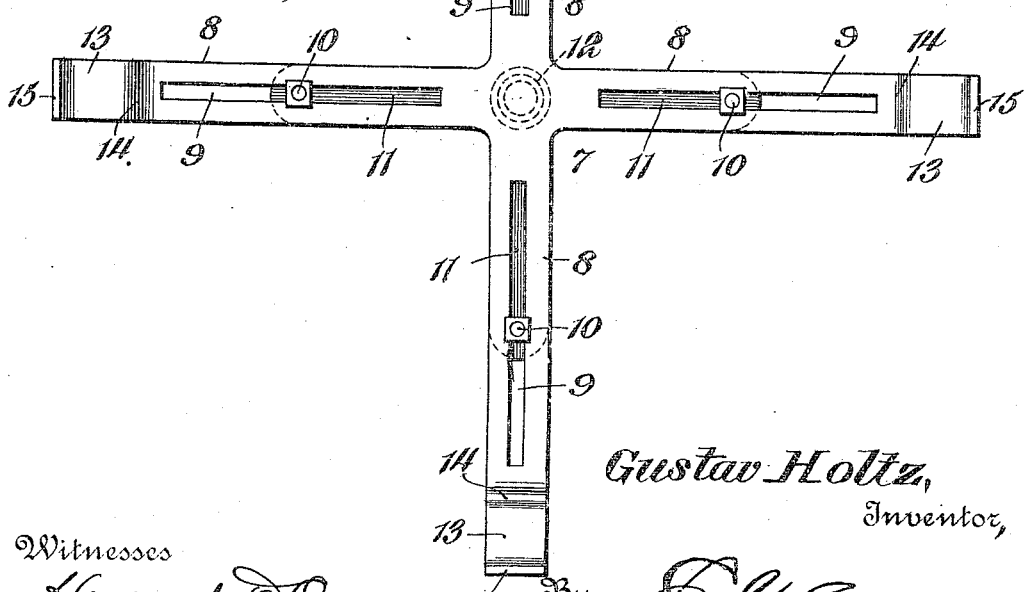
Gustav Holtz,
Inventor,
Witnesses

UNITED STATES PATENT OFFICE.

GUSTAV HOLTZ, OF GOULDSBORO, PENNSYLVANIA.

SANITARY DENTAL-BRACKET TRAY.

959,534.

Specification of Letters Patent. Patented May 31, 1910.

Application filed March 26, 1909. Serial No. 485,928.

*To all whom it may concern:*

Be it known that I, GUSTAV HOLTZ, a citizen of the United States, residing at Gouldsboro, in the county of Wayne and State of Pennsylvania, have invented a new and useful Sanitary Dental-Bracket Tray, of which the following is a specification.

The invention relates to a sanitary dental bracket tray.

The primary object of the invention is to enable dental bracket tables to be maintained in a perfectly sanitary condition and to provide a sanitary dental bracket tray, designed for use on dental wall brackets of the ordinary construction, and capable of also being applied to an ordinary wooden dental bracket table in present use to render the same sanitary.

Another object of the invention is to provide a sanitary tray of this character, having means for holding instruments separated from one another and for preventing the instruments from rolling.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a double dental wall bracket, illustrating the highest and lowest positions of the same and showing a sanitary dental bracket tray, constructed in accordance with this invention and mounted directly on one of the bracket members and applied as an attachment to a wooden dental table carried by the other bracket member. Fig. 2 is an enlarged perspective view of the dental bracket tray. Fig. 3 is a vertical sectional view of the same. Fig. 4 is a plan view, showing the tray-carrying frame secured to the support of a wall bracket.

Like numerals of reference designate corresponding parts in all the figures of the drawings.

1 designates a dental bracket tray, designed to be constructed of glass, china, porcelain, or analogous material presenting a smooth polished non-absorbent surface, adapted to be readily cleaned and maintained in a perfectly sanitary condition. The dental bracket tray 1 comprises in its construction a removable shallow tray, adapted to be readily detached from a bracket so as to be easily and thoroughly cleaned, and consisting of a flat bottom 2 and marginal walls 3, formed integral with the bottom, the dental bracket tray being constructed of a single piece of material of the character before described. The upper and lower faces of the bottom of the tray are perfectly flat, and the lower face is preferably frosted to present a semi-transparent effect and to slightly roughen the bottom of the tray to prevent the hand from slipping, so that the tray may be securely grasped when washing or otherwise handling it. This will prevent the tray from accidentally slipping out of the hands of a person. The upper face and the marginal walls are smooth and highly polished to facilitate thorough cleaning.

The marginal walls, which are designed to support the dental instruments in the usual manner, are provided with scalloped spaced edges 4, forming instrument-receiving notches and adapted to hold the instruments separated, and capable also of preventing the instruments from rolling. The dental tray is designed to permit instruments to be arranged on it in the ordinary manner with the handle end of the instrument resting upon the bottom of the tray, and the outer portion of the instrument arranged in one of the notches, as clearly illustrated in Fig. 2 of the drawings. The notches, which may be of any desired number, are arranged at suitable intervals and space the instruments sufficiently to enable any one of them to be conveniently grasped without disturbing another.

The dental bracket tray is square, and its dimensions correspond with those of the ordinary wooden dental bracket table 5 to enable the sanitary tray to be applied to the wooden table, as illustrated in the lower portion of Fig. 1 of the drawings to render such unsanitary table 5 perfectly sanitary. The sanitary tray 1 fits within the marginal flange or wall 6 of the wooden table 5, and its walls 3 extend above the wall 6 so that the scalloped edges are exposed for use. The sanitary tray by being constructed of a size to fit within the marginal flange 6 is securely seated on and rigidly supported by the wooden table 5 when in use, and may be readily removed therefrom when it is desired to clean the sanitary tray 1.

In order to enable the sanitary tray to be applied to any dental bracket on the market, either during the manufacture of the latter or by the removal of the wooden table, it is equipped with a bracket-carrying frame 7, consisting of four outwardly extending arms 8, disposed diametrically of the table and arranged at right angles to each other. The supporting arms are provided with longitudinal slots 9 for the reception of bolts 10, or other suitable fastening devices for securing the frame to the arms of a support 11 of an ordinary dental wall bracket. The support 11 consists of four diametrically arranged arms and a central depending vertical pivot 12, fitted in a suitable socket of the bracket and adapted to permit the tray to be rotated. The slots 9 are of sufficient length to accommodate fastening devices, located at different distances from the center of the support. The arms 8 are provided with raised tray supporting portions 13, connected with the inner portions of the arms by bends 14, extending upward from the said inner portions to raise the supporting portions 13 above the plane of the fastening devices 10. This provides ample space for the nuts of the fastening devices 10, as clearly shown in Fig. 3 of the drawings. The ends of the arms 8 are extended upward to provide vertical lugs or flanges 15 for engaging the outer faces of the marginal walls of the tray. The tray fits snugly within the upwardly projecting terminal lugs, and is rigidly supported by the frame 7. The tray is adapted to be readily removed from and replaced on the frame 7, so that with little effort it may be easily maintained in a perfectly sanitary condition. The frosted bottom besides serving to prevent the tray from slipping out of the hand enables the former to be more securely seated on the plush top of a wooden table, and owing to the frictional engagement between the bottom of the tray and the plush covering, there is no liability of the sanitary tray being accidentally knocked off the bracket.

Having thus fully described my invention, what I claim as new and desire to secure by Letters Patent, is:

1. A sanitary dental bracket tray constructed of a single piece of glass and consisting of a flat bottom, and marginal side walls scalloped at their upper edges to form spaced instrument-receiving recesses, the upper face of the bottom and the side walls having smooth surfaces, and the lower face being frosted to render it semi-transparent and to prevent the hand from slipping and to produce a frictional engagement between the bottom of the tray and the plush covering of a wooden dental table.

2. A sanitary dental bracket tray including a shallow tray consisting of a flat bottom, and integral marginal walls, and a tray-carrying frame composed of outwardly extending centrally connected arms provided intermediate of their ends with longitudinal slots to receive fastening devices for securing the frame to the support of a bracket, said arms being provided with raised outer supporting portions receiving the tray and adapted to hold the same out of contact with the fastening devices of the said frame.

3. A sanitary dental bracket tray including a shallow tray consisting of a flat bottom, and integral marginal walls, and a tray-carrying frame composed of outwardly extending centrally connected arms provided intermediate of their ends with longitudinal slots to receive fastening devices for securing the frame to the support of a bracket, said arms being bent upward beyond the slots and having outer raised supporting portions receiving the tray and provided with upwardly extending lugs engaging the outer faces of the marginal walls of the said tray.

In testimony, that I claim the foregoing as my own, I have hereto affixed my signature in the presence of two witnesses.

GUSTAV HOLTZ.

Witnesses:
JOHN H. SIGGERS,
DAVID R. WAGNER.